United States Patent
Wadhwa et al.

(10) Patent No.: US 8,831,200 B2
(45) Date of Patent: Sep. 9, 2014

(54) SYSTEMS, METHODS, AND COMPUTER READABLE MEDIA FOR COMMUNICATING CALLING NAME INFORMATION BETWEEN SIGNALING SYSTEM 7 (SS7) AND NON-SS7 NETWORKS

(75) Inventors: Amrit P. S. Wadhwa, Cary, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 1123 days.

(21) Appl. No.: 12/534,754

(22) Filed: Aug. 3, 2009

(65) Prior Publication Data

US 2010/0034365 A1 Feb. 11, 2010

Related U.S. Application Data

(60) Provisional application No. 61/085,686, filed on Aug. 1, 2008.

(51) Int. Cl.
*H04M 7/00* (2006.01)
*H04M 15/06* (2006.01)

(52) U.S. Cl.
CPC ................................ *H04M 15/06* (2013.01)
USPC ................................ 379/219; 379/207.02

(58) Field of Classification Search
USPC ................ 379/88.01–88.28, 142.02–142.18
See application file for complete search history.

(56) References Cited

U.S. PATENT DOCUMENTS

| | | | |
|---|---|---|---|
| 6,693,897 B1 * | 2/2004 | Huang | 370/352 |
| 6,865,260 B1 * | 3/2005 | Meadows et al. | 379/88.22 |
| 7,079,837 B1 * | 7/2006 | Sherman et al. | 455/415 |
| 7,136,466 B1 * | 11/2006 | Gao | 379/93.23 |
| 7,933,392 B1 * | 4/2011 | Hannan et al. | 379/111 |
| 8,254,551 B2 * | 8/2012 | Heinze et al. | 379/220.01 |
| 2003/0152064 A1 * | 8/2003 | Khan et al. | 370/352 |
| 2004/0038672 A1 * | 2/2004 | Nguyen et al. | 455/415 |
| 2007/0127656 A1 * | 6/2007 | Citron et al. | 379/142.01 |
| 2008/0260119 A1 | 10/2008 | Marathe et al. | |
| 2008/0285438 A1 | 11/2008 | Marathe et al. | |
| 2009/0080441 A1 * | 3/2009 | Krishnan et al. | 370/400 |

OTHER PUBLICATIONS

Michael McGrew (Lucent Technologies Inc.), Transport SS7 Signalling Over IP, Nov. 1998, pp. 1-9.*
Dan O'Shea, Mating season: SS7 and IP technologies drive the dawning of hybrid networks, Sep. 20, 1999, pp. 1-3.*
"VeriSign® Calling Name Services," VeriSign, Inc., pp. 1-2 (Copyright 2005).
Russell, "Signaling System #7: Calling Name (CNAM)," Third Edition, p. 93 (Copyright 2000).

* cited by examiner

*Primary Examiner* — Duc Nguyen
*Assistant Examiner* — Assad Mohammed
(74) *Attorney, Agent, or Firm* — Jenkins, Wilson, Taylor & Hunt, P.A.

(57) ABSTRACT

Systems, methods, and computer readable media for communicating calling name information between signaling system 7 (SS7) and non-SS7 networks are disclosed. According to one aspect, the subject matter described herein includes a method for communicating calling name information between signaling system 7 (SS7) and non-SS7 networks. An entity for processing signaling messages receives an SS7 message that includes a calling party identifier, and uses the calling party identifier to obtain calling name information associated with the calling party. The SS7 message is modified to include the calling name information and sent to a gateway network element for communicating messages between SS7 networks and non-SS7 networks.

28 Claims, 6 Drawing Sheets

SYSTEMS, METHODS, AND COMPUTER READABLE MEDIA FOR COMMUNICATING CALLING NAME INFORMATION BETWEEN SIGNALING SYSTEM 7 (SS7) AND NON-SS7 NETWORKS

PRIORITY CLAIM

This application claims the benefit of U.S. Provisional Patent Application Ser. No. 61/085,686, filed Aug. 1, 2008; the disclosure of which is incorporated herein by reference in its entirety.

TECHNICAL FIELD

The subject matter described herein relates to methods and systems for communications in mixed networks. More particularly, the subject matter described herein relates to systems, methods, and computer readable media communicating calling name information between signaling system 7 (SS7) and non-SS7 networks.

BACKGROUND

Subscribers in telecommunications networks desire to know the identity of the person who is calling them, i.e., the calling party's identification, commonly referred to as caller ID (CID). One of the first forms of caller identification was made available to users of public switched telephone networks (PSTN), also known as plain old telephone service (POTS), and it displayed to the called party the calling party's telephone number. Although known as caller ID, it is more precisely known as calling number identification (CNID), since it displays the identity of the number used by the caller, rather than the actual identify of the caller. Nevertheless, since the correlation between the caller and the calling party number used by the caller is high, identifying the calling party number usually suffices to identify the calling party.

A later form of caller identification was developed, which, instead of displaying the calling party's number, displayed a name that was associated with that number. This form of caller identification is known as calling name identification, or "CNAM". Like CNID, CNAM too was originally developed on PSTN networks, which use the signaling system 7 (SS7) protocol for call setup, takedown, and other call-related functions.

With the advent of packet networks, such as the Internet, the distinction between traditional telecommunication networks, such as PSTN networks using SS7, and data networks, such as the Internet, became increasingly blurred as telephone calls were routed through packet networks (e.g., voice-over IP, or VoIP), and Internet services were made available to mobile telephone users (e.g., web browsing on a smart phone). The session initiation protocol (SIP) became increasingly popular due to its ability to manage multimedia streams between endpoints, e.g., allowing a cell phone user to download and play music from a internet host, allowing computer users to hold videoconferences over the Internet, and so on.

One problem, however, is that since SIP and SS7 were developed separately and on incompatible network types (packet switched and circuit-switched, respectively), some services available on PSTN networks are not available on SIP networks, and vice versa. One such service is CNAM, which was originally developed for SS7 networks. Thus, the CNAM databases are typically located in SS7 networks, and respond to queries using SS7 protocols. As a result, the existing SS7 infrastructure that provides the CNAM service for mapping a PSTN telephone number to a calling name is not accessible to SIP nodes which communicate using the SIP protocol. In other words, SIP nodes can't perform CNAM queries into the SS7 domain using the SIP protocol.

There have been two conventional solutions to this problem. The first solution is to upgrade the CNAM databases in the SS7 domain to handle queries from SIP nodes. This conceptually moves the SS7-based CNAM databases into the SIP domain. The second solution is to upgrade all SIP nodes to perform CNAM queries using SS7 protocols. This conceptually moves the SIP nodes into the SS7 domain. Both solutions are very expensive, requiring additional software and hardware for every SIP node in the packet-switched network, every CNAM node in the circuit-switched network, or some combination of the two.

Accordingly, there exists a need for an inexpensive way to pass CNAM information associated with a call from an SS7 domain into a SIP domain. Specifically, there exists a need for communicating calling name information between signaling system 7 (SS7) and non-SS7 networks.

SUMMARY

According to one aspect, the subject matter described herein includes a method for communicating calling name information between signaling system 7 (SS7) and non-SS7 networks. An entity for processing signaling messages receives an SS7 message that includes a calling party identifier and uses the calling party identifier to obtain calling name information associated with the calling party. The SS7 message is modified to include the calling name information and sent to a gateway network element for communicating messages between SS7 networks and non-SS7 networks.

According to another aspect, the subject matter described herein includes a node for communicating calling name information between signaling system 7 (SS7) and non-SS7 networks. The node includes a communications interface for sending and receiving SS7 signaling messages and a message processing module. The message processing module receives, from the communications interface, an SS7 message that includes a calling party identifier, uses the calling party identifier to obtain calling name (CNAM) information associated with the identified calling party, modifies the SS7 message to include the obtained CNAM information, and sends the modified SS7 message to a gateway network element for communicating messages between SS7 networks and non-SS7 networks.

According to yet another aspect, the subject matter described herein includes a signaling gateway for communicating caller name (CNAM) information between a system signaling 7 (SS7) and a non-SS7 network. The gateway includes a communications interface for receiving SS7 signaling messages and a message processing module. The message processing module receives, via the communications interface, an SS7 message that includes a calling party identifier and calling name information and extracts the calling name information. The message processing module stores the association between the calling party identifier and the calling name information, and/or converts the SS7 message to a non-SS7 message that includes the calling name information and sends the non-SS7 message to a node in the non-SS7 network.

According to yet another aspect, the subject matter described herein includes a system for communicating calling name (CNAM) information between signaling system 7 (SS7) and non-SS7 networks. The system includes a gateway network element for communicating messages between an SS7 network and a non-SS7 network and a network node for receiving an SS7 message that includes a calling party identifier, using the calling party identifier to obtain CNAM information associated with the identified calling party, modifying the SS7 message to include the obtained CNAM information, and sending the modified SS7 message to the gateway network element.

The subject matter described herein for communicating calling name information between signaling system 7 (SS7) and non-SS7 networks may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer program products are provided for communicating calling name information between signaling system 7 (SS7) and non-SS7 networks. In one embodiment, an SS7 signaling message is modified in transit to include calling name information for the calling party. This additional information, i.e., the calling name information, may be added to an existing ISUP message parameter or may be included in a new ISUP message parameter of the signaling message. The modified message is then sent or forwarded to the message destination. For this reason, this process may be hereinafter referred to as "ISUP CNAM stuffing."

For example, In a call originating in system signaling number 7 (SS7) protocol network, such as a public switched telephone network (PSTN), and terminating in a session initiation protocol (SIP) network, such as an Internet protocol multimedia subsystem (IMS) network, an SS7 message, such as an ISDN standard user part (ISUP) message initial address message (IAM), that includes a calling party identifier is modified to include CNAM information associated with the calling party and forwarded to a gateway network element, such as a SIP/SS7 gateway. This is hereinafter referred to as "ISUP CNAM stuffing."

Figure 1:
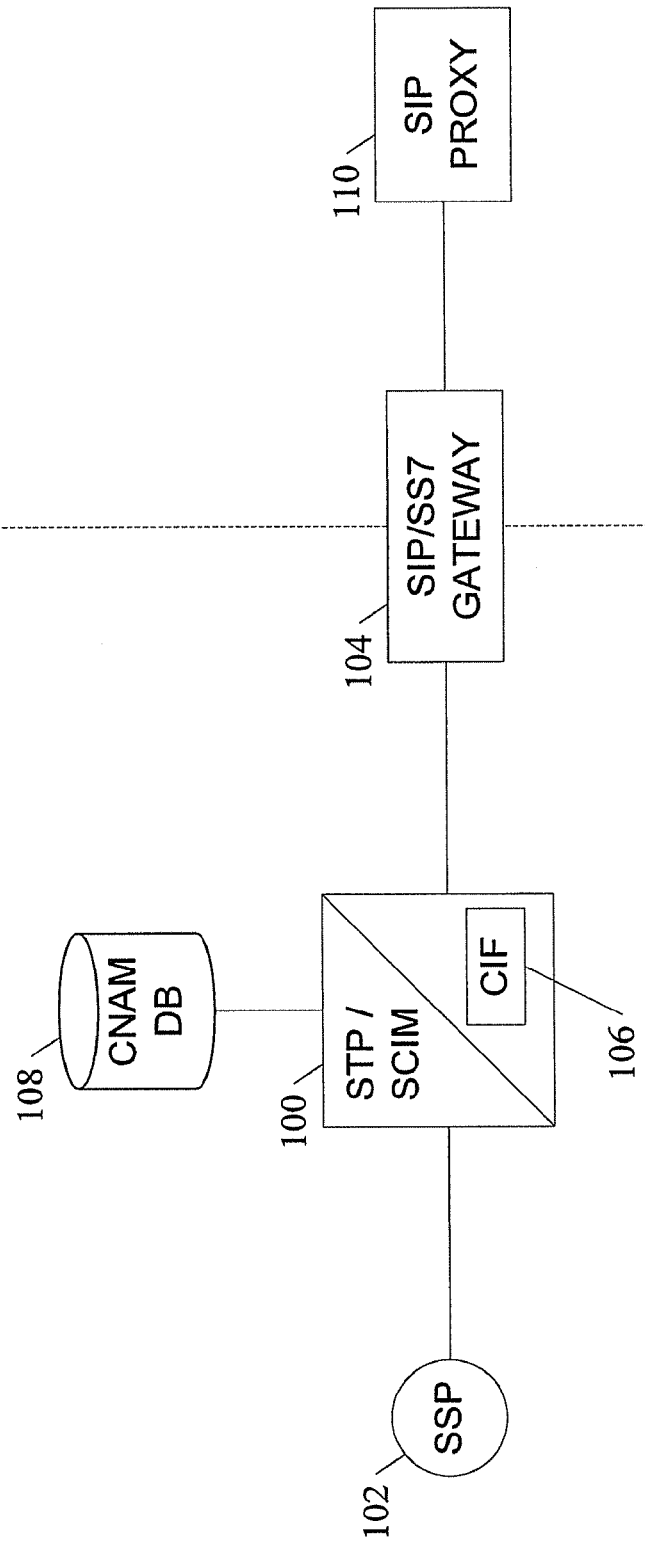
FIG. 1 is a block diagram illustrating an exemplary system for communicating calling name information between signaling system 7 (SS7) and non-SS7 networks according to an embodiment of the subject matter described herein.

FIG. 1 is a block diagram illustrating an exemplary system for communicating calling name information between signaling system 7 (SS7) and non-SS7 networks according to an embodiment of the subject matter described herein. In the embodiment illustrated in FIG. 1, a telecommunications network includes an SS7 network and a non-SS7 network, which in this example is a SIP network. The SS7 network includes a network node for processing signaling messages, such as signal transfer point (STP) 100, which routes signaling messages between other nodes in the SS7 network, such as between a service switching point (SSP) 102 and a gateway network element 104. In the embodiment illustrated in FIG. 1, gateway network element 104 is a SIP/SS7 gateway for communicating messages, including signaling messages, between the SS7 network and the SIP network.

In alternate embodiments, network node for processing messages 100 may include but are not limited to a service capability interaction manager (SCIM) node, a softswitch, an access mediation node, a media gateway controller, an Internet protocol STP, or an SS7 signaling gateway, for example.

In alternate embodiments, gateway network element 104 may be a softswitch, a media gateway controller, a breakout gateway control function (BGCF), a session border controller (SBC), or another type of SS7-to-non-SS7 interworking node. In one embodiment, STP 100 may include a service capability interaction manager (SCIM) for performing service interaction and mediation. As used herein, the term "service interaction" refers to the process of managing interactions between network entities that request and use network services, commonly referred to as service clients, and network entities that provide network services, commonly referred to as application servers. The term "service mediation" refers to the conversion of messages from one message protocol into another message protocol. An exemplary embodiment of a SCIM function is disclosed in common owned and assigned U.S. patent application Publication Ser. Nos. 12/106,807 and 12/106,869, both of which were filed on Apr. 21, 2008, hereby incorporated herein in their entireties.

In the embodiment illustrated in FIG. 1, STP 100 includes a CNAM interworking function (CIF) 106, for communicating with a calling name information module which maps calling name and/or address information associated with a party to other information identifying the party, CNAM database 108. In one embodiment, CIF 106 may send a query including a numeric calling party identifier to CNAM database 108 and receive a response including calling name information from CNAM database 108. In the embodiment illustrated in FIG. 1, the SIP network includes a SIP proxy 110, which may provide SIP name or address resolution services to other nodes within the SIP network, for example.

Figure 2:
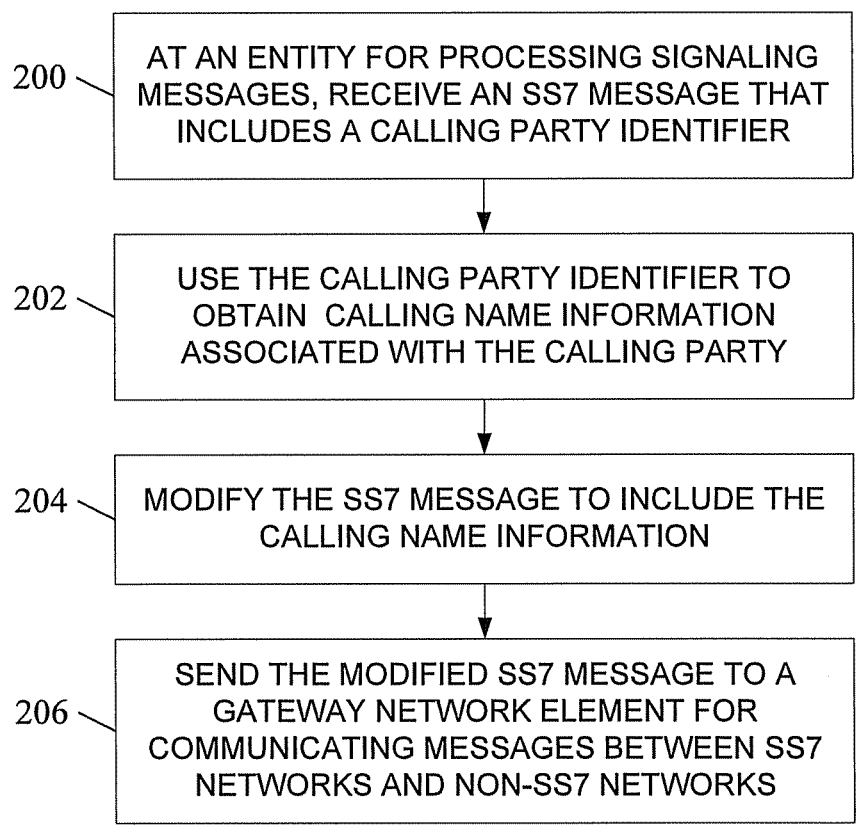
FIG. 2 is a flow chart illustrating an exemplary process for communicating calling name information between SS7 and non-SS7 networks according to an embodiment of the subject matter described herein.

FIG. 2 is a flow chart illustrating an exemplary process for communicating calling name information between SS7 and non-SS7 networks according to an embodiment of the subject matter described herein. At block 200, an entity for processing signaling messages receives an SS7 message that includes a calling party identifier. At block 202, the calling party identifier is used to obtain calling name information associated with the calling party. At block 204, the received SS7 message is modified to include the calling name information. At block 206, the modified SS7 message is sent to a gateway network element for communicating messages between SS7 networks and non-SS7 networks. This process will now be described in more detail in FIG. 3.

Figure 3:
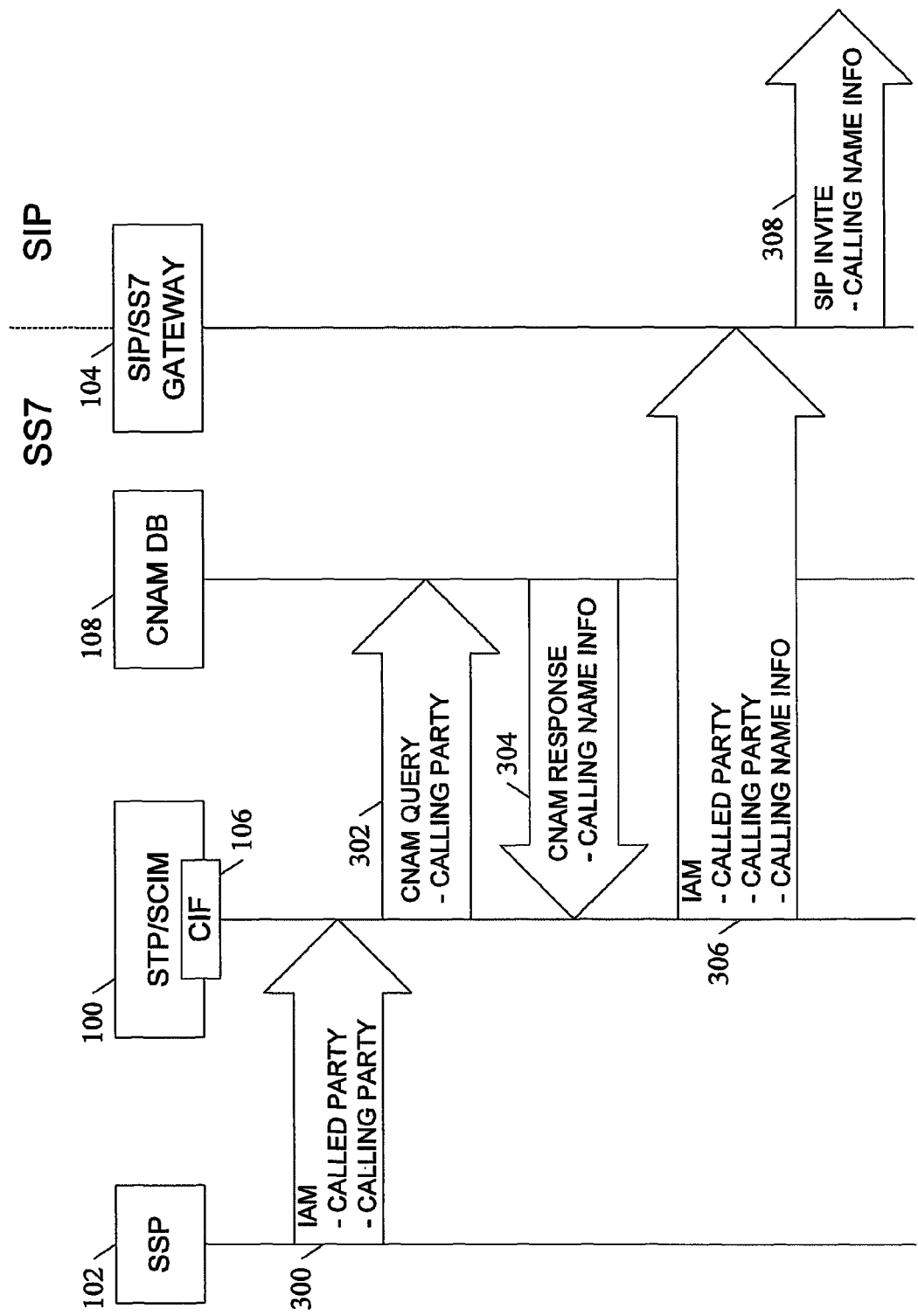
FIG. 3 is a call flow diagram (ladder diagram) illustrating signaling messages exchanged during the process described in FIG. 2 according to an embodiment of the subject matter described herein.

FIG. 3 is a call flow diagram (ladder diagram) illustrating signaling messages exchanged during the process described in FIG. 2 according to an embodiment of the subject matter described herein. Referring to FIG. 3, STP 100 may receive a message 300 that includes a calling party identifier. For example, SSP 102 may send an ISUP messages, such as an ISUP initial address message (IAM) or subsequent address message (SAM). In the embodiment illustrated in FIG. 3, SSP 102 sends an ISUP IAM message 300 that includes called party information and calling party information. Message 300 is processed by CIF 106, which extracts the calling party identifier and uses it to send a query message 302 to CNAM database 108. Examples of calling party identifiers include a PSTN number or directory number, a mobile telephone number, a short code, or other forms of calling number identification.

CNAM database 108 uses the calling party identifier to determine calling name information that is associated with the calling party identifier. In one embodiment, CNAM database 108 may receive query message 302, extract the calling party identifier from message 302, and use the calling party identifier to perform a database lookup to retrieve the calling name information associated with the calling party identifier. The association between the calling party identifier and the calling name information may be maintained in a database, a table, a data store, a data structure, and a memory location.

In one embodiment, CNAM database 108 may be located remotely from STP 100. Alternatively, CNAM database 108 may be co-located with or be a component of signal processing node 100. In one embodiment, CIF 106 may issue a transaction capabilities application part (TCAP) query to CNAM database 108 and receive a TCAP response from CNAM database 108. Alternatively, other protocols may be used for the query, including Internet Engineering Task Force SIGTRAN SCCP user adaptation layer (SUA), structured query language (SQL), hypertext transfer protocol (HTTP), hypertext markup language (HTML), extensible markup language (XML), file transfer protocol (FTP), simple object access protocol (SOAP), a database query, a table lookup query, or other protocol usable for accessing information, including SS7 protocol, IP protocol, SIP protocol, and so on.

In one embodiment, CNAM database 108 may be provisioned by the network operator. In one embodiment where CNAM database 108 is co-located with STP 100, CNAM database 108 may function like a cache, temporarily storing calling party identifiers and their associated calling name information gleaned from signaling traffic that passes through STP 100. In another embodiment, the CNAM database co-located with the STP may be provisioned with CNAM information for some or all of a network operator's subscribers. In another embodiment, a "national" CNAM database may include CNAM information for some or all subscribers of multiple communication networks. CNAM database 108 may reside within the SS7 network or may reside outside of the SS7 network.

CNAM database 108 may then send to STP 100 a response message 304 that includes the calling name information. Examples of calling name information include a subscriber name of the calling party, a city and/or state associated with the calling party, and a city and/or state from which the call originates, or other names that would help identify the calling party.

CIF 106 may then extract the calling name information from response message 304 and add it to the original ISUP IAM message 300 to create a modified ISUP IAM message 306. In one embodiment, modified ISUP IAM message 306 includes calling name information as additional information appended to the calling party parameter. Alternatively, the calling name information may be included in other parameters, such as an ISUP user-to-user parameter. CIF 106 need not rely solely on parameters that existed in the original ISUP IAM message 300, but may add new parameters as needed. Modified ISUP IAM message 306 is transmitted to its target destination SIP/SS7 gateway 104.

In one embodiment, SIP/SS7 gateway 104 may convert the ISUP IAM message 306 into a SIP INVITE message 308 that includes the calling name information. In this manner, calling name information retrieved from SS7-based databases may be transmitted to a SIP network via gateway 104.

Figure 4:
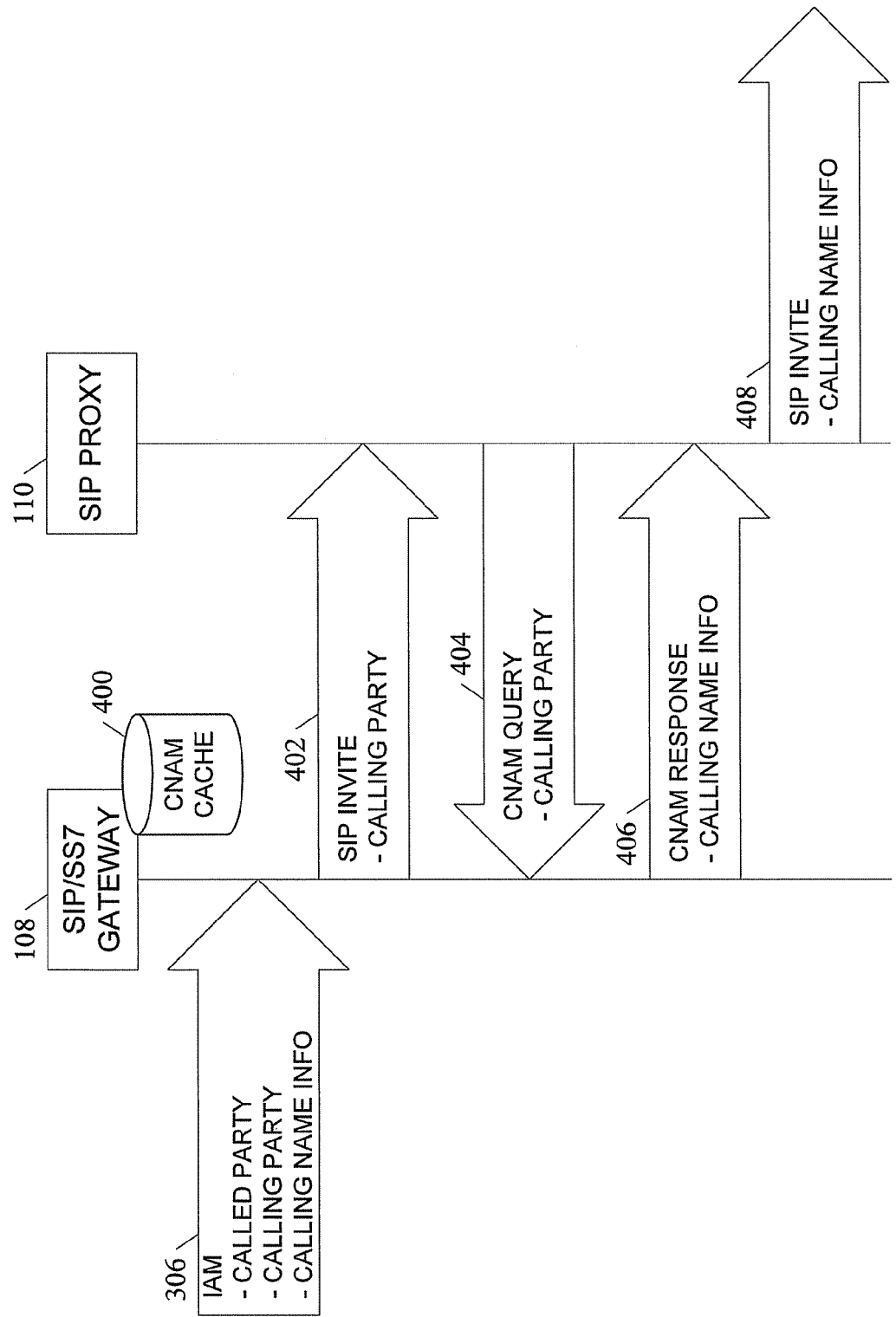
FIG. 4 is a call flow diagram illustrating signaling messages exchanged between nodes of an exemplary system for communicating calling name information between signaling system 7 (SS7) and non-SS7 networks according to another embodiment of the subject matter described herein.

FIG. 4 is a call flow diagram illustrating signaling messages exchanged between nodes of an exemplary system for communicating calling name information between signaling system 7 (SS7) and non-SS7 networks according to another embodiment of the subject matter described herein. In the embodiment illustrated in FIG. 4, the functions of SIP/SS7 gateway 108 and SIP proxy 110 are substantially identical to their like-numbered counterparts in FIG. 1, and thus their descriptions will not be repeated here. However, in the embodiment illustrated in FIG. 4, SIP/SS7 gateway contains a calling name information cache 400 for storing calling name information, as will now be explained in detail.

In the embodiment illustrated in FIG. 4, SIP/SS7 gateway 108 receives a modified ISUP IAM message 306 that includes calling name information. Unlike the embodiment illustrated in FIG. 3, in which SIP/SS7 gateway 108 generates a SIP INVITE message that contains the calling name information, in FIG. 4, SIP/SS7 gateway 108 generates a SIP INVITE message 402 that does not include calling name information. Instead, the calling party information its associated calling name information is stored in CNAM cache 400 for later use.

In the embodiment illustrated in FIG. 4, SIP proxy 110 receives the SIP INVITE, message 402, and generates a CNAM query message 404 to SIP/SS7 gateway 108. In response to receiving CNAM query 404, SIP/SS7 gateway 108 retrieves the calling name information from CNAM cache 400 and generates a CNAM response message 406 that includes the retrieved calling name information. Like CNAM database 108, CNAM cache 400 may be provisioned by the network operator, or it may cache calling party identifiers and their associated calling name information gleaned from signaling traffic that passes through SIP/SS7 gateway 108. CNAM cache 400 may be a cache, a database, a table, a data store, a data structure, a memory location, or some combination of the above.

In one embodiment, SIP/SS7 gateway 108 sends CNAM response message 406 to SIP proxy 110, which generates a SIP INVITE message 408 that includes the calling name information.

Figure 5:
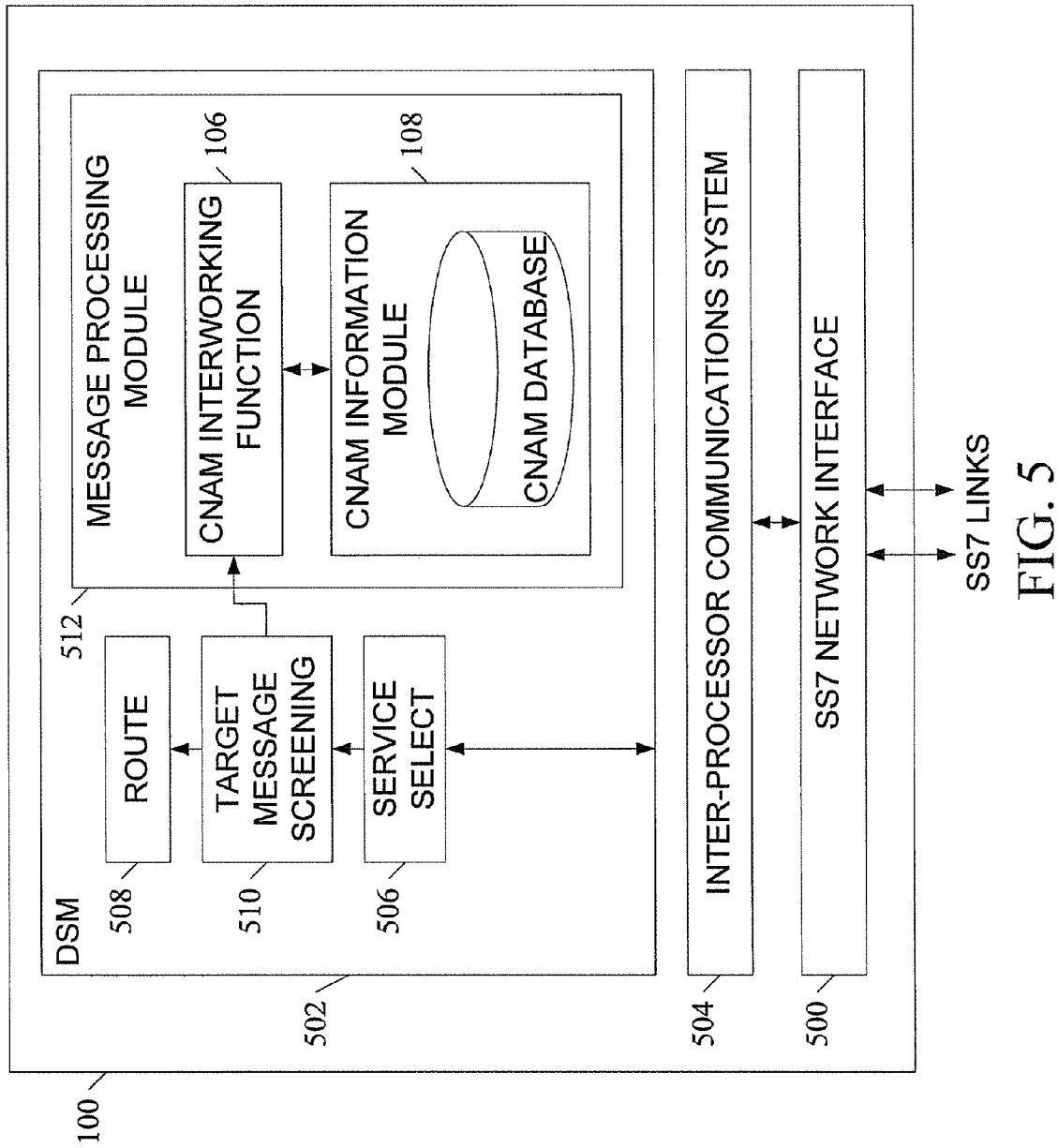
FIG. 5 is a block diagram illustrating an exemplary network node for processing signaling messages according to an embodiment of the subject matter described herein.

FIG. 5 is a block diagram illustrating an exemplary network node for processing signaling messages according to an embodiment of the subject matter described herein. In the embodiment illustrated in FIG. 5, network node for processing signaling messages 100 is an STP that also includes calling name information module 108.

In the embodiment illustrated in FIG. 5, STP 100 may include a communications interface, such as an SS7 network interface module 500, and a database services module (DSM 502), which communicate with each other via an inter-processor communications system 504. Each module 500, 502, and 504 may include a printed circuit board, an application processor for performing application level processing of signaling messages, and a communications processor for controlling inter-processor communications via inter-processor communications system 504. Inter-processor communications system 504 may be any suitable mechanism for providing message communication between modules 500, 502, and 504. For example, inter-processor communications system 504 may be a bus, an Ethernet LAN, or any other suitable mechanism for providing communications between processors. In the embodiment illustrated in FIG. 5, SS7 network interface 500 may be connected to one or more SS7 links.

DSM 502 may include various functions and databases for processing signaling messages. In the illustrated example, DSM 502 incorporates CNAM interworking function 106 and CNAM information module 108 and its associated databases, such as the CNAM database illustrated in FIG. 5. Within DSM 502, service selection function 506 receives messages from the interface processors and determines the type of service required for each message. For example, service selection function 506 may determine whether further screening of messages is required or whether the messages are simply to be global title translated and routed using route function 508. In one embodiment, service selection function 506 may forward all messages to target message screening function 510. Target message screening function 510 may send ISUP IAM or SAM messages to message processing module 512 for processing. In one embodiment, message processing module 512 may include CNAM interworking function 106 and CNAM information module 108.

In the embodiment illustrated in FIG. 5, CIF 106 may extract the calling party identifier from the ISUP IAM or SAM messages that it receives from target message screening function 510 and send the calling party identifier to CNAM information module 108, which performs a database lookup on its CNAM database and returns the calling name information to CIF 106. CIF 106 may then modify the received ISUP message to include the calling name information and send the message to SS7 network interface 500 for transmission to its intended destination.

Figure 6:
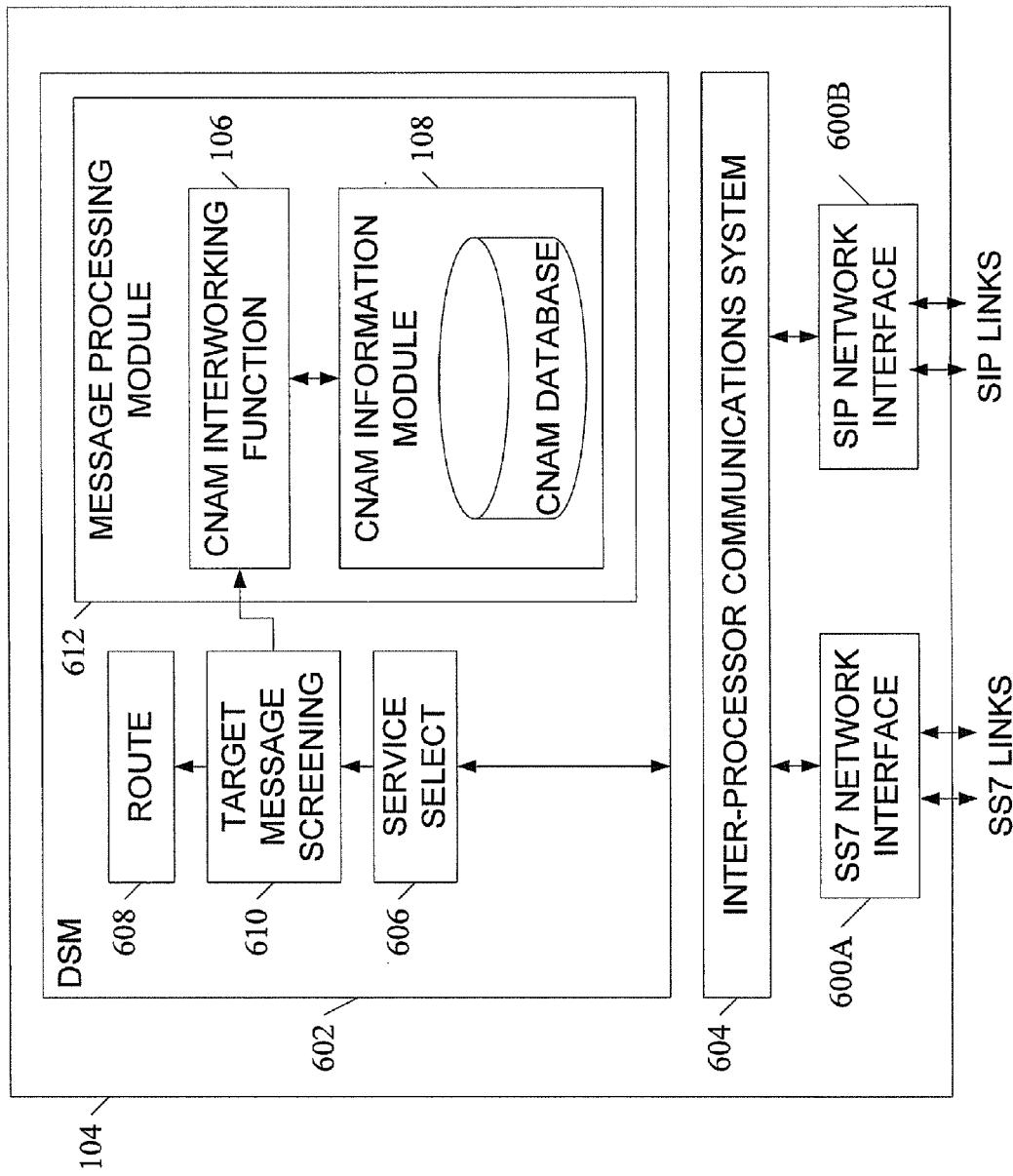
FIG. 6 is a block diagram illustrating an exemplary signaling gateway for communicating caller name (CNAM) information between a system signaling 7 (SS7) and a non-SS7 network according to an embodiment of the subject matter described herein.

FIG. 6 is a block diagram illustrating an exemplary signaling gateway for communicating caller name (CNAM) information between a system signaling 7 (SS7) and a non-SS7 network according to an embodiment of the subject matter described herein.

In the embodiment illustrated in FIG. 6, gateway 104 may include communications interfaces, such as an SS7 network interface module 600A and a SIP interface module 600B, and a database services module (DSM 602), which communicate with each other via an inter-processor communications system 604. Each module 600A, 600B, 602, and 604 may include a printed circuit board, an application processor for performing application level processing of signaling messages, and a communications processor for controlling inter-processor communications via inter-processor communications system 604. Inter-processor communications system 604 may be any suitable mechanism for providing message communication between modules 600A, 600B, 602, and 604. For example, inter-processor communications system 604 may be a bus, an Ethernet LAN, or any other suitable mechanism for providing communications between processors. In the embodiment illustrated in FIG. 6, SS7 network interface 600 may be connected to one or more SS7 links, and SIP network interface 600B may be connected to one or more SIP links.

DSM 602 may include various functions and databases for processing signaling messages. In the illustrated example, DSM 602 incorporates CNAM interworking function 106 and CNAM information module 108 and its associated databases, such as the CNAM database illustrated in FIG. 5. Within DSM 602, service selection function 606 receives messages from the interface processors and determines the type of service required for each message. For example, service selection function 606 may determine whether further screening of messages is required or whether the messages are simply to be global title translated and routed using route function 608. In one embodiment, service selection function 606 may forward all messages to target message screening function 610. Target message screening function 610 may send ISUP IAM or SAM messages to message processing module 612 for processing. In one embodiment, message processing module 612 may include CNAM interworking function 106 and CNAM information module 108.

In the embodiment illustrated in FIG. 6, message processing module 612 may extract the calling party identifier from the ISUP IAM or SAM messages that it receives from target message screening function 610 and send the calling party identifier to CNAM information module 108, which performs a database lookup on its CNAM database. Message processing module 612 may then store the association between the calling party identifier and the calling name information, and/or convert the SS7 message to a non-SS7 message, such as a SIP message, and send the non-SS7 message to a node in the non-SS7 network, such as via SIP network interface 600B.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for communicating calling name information between signaling system 7 (SS7) and non-SS7 networks, the method comprising:
at an SS7 signaling message routing node:
receiving an SS7 message that includes a calling party identifier;
using the calling party identifier to obtain calling name information associated with the calling party;
modifying the SS7 message to include the calling name information; and
sending the modified SS7 message to a gateway network element for communicating messages between SS7 networks and non-SS7 networks; and
at the gateway network element:
receiving the modified SS7 message including the calling party identifier and the calling name information, extracting the calling party identifier and the calling name information from the received modified SS7 message, and storing an association between the calling party identifier and calling name information;
generating and sending a first non-SS7 message including the calling party identifier to a node within the non-SS7 network; and
receiving, from the node within the non-SS7 network, a request for calling name information associated with the calling party identifier, extracting the calling party identifier from the received request, determining calling name information using the extracted calling party identifier and the stored association between the calling party identifier and calling name information, and sending a response that includes the calling name information associated with the calling party identifier.

2. The method of claim 1 wherein the received SS7 message comprises an integrated service digital network user part (ISUP) message.

3. The method of claim 2 wherein the ISUP message comprises at least one of an initial address message (IAM) and a subsequent address message (SAM).

4. The method of claim 2 wherein the calling party identifier comprises one of:
   a public switched telephone network (PSTN) number;
   a mobile telephone number; and
   a short code.

5. The method of claim 1 wherein the calling name information comprises one of:
   a subscriber name of the calling party;
   a city associated with the calling party;
   a city from which the call originates;
   a state associated with the calling party; and
   a state from which the call originates.

6. The method of claim 1 wherein the calling name information is maintained within the SS7 network.

7. The method of claim 1 wherein using the calling party identifier to obtain calling name information associated with the calling party comprises retrieving calling name information from at least one of a cache, a database, a table, a data store, a data structure, and a memory for maintaining the association between the calling party identifier and the calling name information.

8. The method of claim 1 wherein using the calling party identifier to obtain calling name information associated with the calling party comprises sending a query that includes the calling party identifier and receiving a response to the query, the response including the calling name information associated with the calling party identifier.

9. The method of claim 8 wherein the query comprises at least one of a transaction capabilities application part (TCAP) query, a structured query language (SQL) query, an IETF SIGTRAN SUA query, a hypertext transfer protocol (HTTP) query, a hypertext markup language (HTML) query, an extensible markup language (XML) query, file transfer protocol (FTP) query, simple object access protocol (SOAP) query, a database query, and a table lookup query.

10. The method of claim 1 wherein the calling name information is located remotely from the entity for processing signaling messages.

11. The method of claim 1 wherein the calling name information is co-located with the entity for processing signaling messages or is a component of the entity for processing signaling messages.

12. The method of claim 1 wherein the modified SS7 message includes the calling name information within an existing parameter or includes the calling name information within a parameter that was added to the received SS7 message.

13. The method of claim 1 comprising, at the gateway network element:
   receiving the modified SS7 message including the calling name information;
   extracting the calling name information from the received modified SS7 message; and
   generating and sending a non-SS7 message including the calling name information.

14. The method of claim 1 wherein storing an association between the calling party identifier and calling name information includes storing the association in at least one of a cache, a database, a table, a data store, a data structure, and a memory.

15. The method of claim 1 comprising, at the node within the non-SS7 network, receiving, from the gateway network element, the response that includes the calling name information associated with the calling party identifier, extracting the calling name information from the received response, and generating and sending a second non-SS7 message that includes the calling name information.

16. The method of claim 15 wherein sending the first or second non-SS7 message includes sending a SIP invite message.

17. A system for communicating calling name (CNAM) information between signaling system 7 (SS7) and non-SS7 networks, the system comprising:
   a gateway network element for communicating messages between SS7 networks and non-SS7 networks; and
   an SS7 signaling message routing node for receiving an SS7 message that includes a calling party identifier, using the calling party identifier to obtain calling name information associated with the calling party, modifying the SS7 message to include the calling name information, and sending the modified SS7 message to the gateway network element, which receives the modified SS7 message including the calling party identifier and the calling name information, extracts the calling party identifier and the calling name information from the received modified SS7 message, stores an association between the calling party identifier and calling name information, and generates and sends a first non-SS7 message including the calling party identifier to a node within the non-SS7 network,
   wherein the gateway network element receives, from the node within the non-SS7 network, a request for calling name information associated with the calling party identifier, extracts the calling party identifier from the received request, determines calling name information using the extracted calling party identifier and the stored association between the calling party identifier and calling name information, and sends a response that includes the calling name information associated with the calling party identifier.

18. The system of claim 17 wherein the received SS7 message comprises an integrated service digital network user part (ISUP) message.

19. The system of claim 18 wherein the ISUP message comprises at least one of an initial address message (IAM) and a subsequent address message (SAM).

20. The system of claim 17 wherein the calling party identifier comprises at least one of:
   a public switched telephone network (PSTN) number;
   a mobile telephone number; and
   a short code.

21. The system of claim 17 wherein the calling name information comprises one of:
   a subscriber name of the calling party;
   a city associated with the calling party;
   a city from which the call originates;
   a state associated with the calling party; and
   a state from which the call originates.

22. The system of claim 17 wherein the SS7 signaling message routing node obtains the CNAM information from at least one of a cache, a database, a table, a data store, a data structure, and a memory for maintaining the association between the CNAM information associated with the party and the other information identifying the party.

23. The system of claim 17 wherein the CNAM information obtained by the SS7 signaling message routing node is at least one of co-located with the SS7 signaling message routing node and located remotely from the SS7 signaling message routing node.

24. The system of claim 17 wherein the SS7 signaling message routing node is configured to obtain CNAM information associated with the calling party by sending a query that includes the calling party identifier and receiving a response to the query that includes the CNAM information associated with the calling party identifier.

25. The system of claim 24 wherein the query comprises at least one of a transaction capabilities application part (TCAP) query, a hypertext transfer protocol (HTTP) query, a hypertext markup language (HTML) query, an extensible markup language (XML) query, file transfer protocol (FTP) query, simple object access protocol (SOAP) query, a database query, and a table lookup query.

26. The system of claim 17 wherein the modified SS7 message includes the CNAM information within an existing parameter of the received SS7 message or within a parameter that was added to the received SS7 message.

27. The system of claim 17 wherein
the SS7 signaling message routing node comprises an SS7 signal transfer point (STP), a service capability interaction manager (SCIM) node, a softswitch, an access mediation node, a media gateway controller, an internet protocol STP, or an SS7 signaling gateway.

28. A non-transitory computer readable medium having stored thereon executable instructions that when executed by the processor of a computer control the computer to perform steps comprising:
at an SS7 signaling message routing node:
receiving an SS7 message that includes a calling party identifier;
using the calling party identifier to obtain calling name information associated with the calling party;
modifying the SS7 message to include the calling name information; and
sending the modified SS7 message to a gateway network element for communicating messages between SS7 networks and non-SS7 networks; and
at the gateway network element:
receiving the modified SS7 message including the calling party identifier and the calling name information, extracting the calling party identifier and the calling name information from the received modified SS7 message, and storing an association between the calling party identifier and calling name information;
generating and sending a first non-SS7 message including the calling party identifier to a node within the non-SS7 network; and
receiving, from the node within the non-SS7 network, a request for calling name information associated with the calling party identifier, extracting the calling party identifier from the received request, determining calling name information using the extracted calling party identifier and the stored association between the calling party identifier and calling name information, and sending a response that includes the calling name information associated with the calling party identifier.

* * * * *